(12) United States Patent
Kim et al.

(10) Patent No.: US 9,166,423 B2
(45) Date of Patent: Oct. 20, 2015

(54) BATTERY LEAKAGE CURRENT ELIMINATION IN UPS UNITS

(75) Inventors: Sangsun Kim, San Jose, CA (US); Jianshui Wang, Campbell, CA (US)

(73) Assignee: Google Inc., Mountain View, CA (US)

( * ) Notice: Subject to any disclaimer, the term of this patent is extended or adjusted under 35 U.S.C. 154(b) by 567 days.

(21) Appl. No.: 13/588,249

(22) Filed: Aug. 17, 2012

(65) Prior Publication Data

US 2013/0187471 A1    Jul. 25, 2013

Related U.S. Application Data

(60) Provisional application No. 61/590,060, filed on Jan. 24, 2012.

(51) Int. Cl.
| | | |
|---|---|---|
| *H02J 7/00* | (2006.01) | |
| *H02J 9/00* | (2006.01) | |
| *H02J 1/10* | (2006.01) | |
| *H02J 9/06* | (2006.01) | |

(52) U.S. Cl.
CPC .............. *H02J 7/0042* (2013.01); *H02J 1/10* (2013.01); *H02J 7/0045* (2013.01); *H02J 9/06* (2013.01); *Y10T 307/62* (2015.04); *Y10T 307/625* (2015.04)

(58) Field of Classification Search
None
See application file for complete search history.

(56) References Cited

U.S. PATENT DOCUMENTS

| | | |
|---|---|---|
| 4,730,121 A | 3/1988 | Lee et al. |
| 5,216,286 A | 6/1993 | Peterson |
| 5,488,531 A | 1/1996 | Aldridge et al. |
| 5,656,915 A | 8/1997 | Eaves |
| 5,764,032 A | 6/1998 | Moore |
| 5,801,937 A | 9/1998 | Gold et al. |
| 6,040,683 A | 3/2000 | Mottier |
| 6,157,171 A | 12/2000 | Smith |
| 6,903,533 B1 | 6/2005 | Geren et al. |
| 7,245,469 B2 | 7/2007 | Nemoto et al. |

(Continued)

FOREIGN PATENT DOCUMENTS

| | | |
|---|---|---|
| JP | 09308134 A | 11/1997 |
| JP | 2007306662 A | 11/2007 |

OTHER PUBLICATIONS

International Search Report & Written Opinion dated Apr. 25, 2013 for Application No. PCT/US2013/022039.

(Continued)

*Primary Examiner* — Jared Fureman
*Assistant Examiner* — Aqeel Bukhari
(74) *Attorney, Agent, or Firm* — Lerner, David, Littenberg, Krumholz & Mentlik, LLP

(57) ABSTRACT

Aspects of the disclosure relate generally to uninterruptible power supply ("UPS") units for systems requiring back up power. The UPS units include circuitry for controlling charging and allowing discharging of a battery. The circuitry includes a controller as well as a pair of metal-oxide semiconductor field effect transistors ("MOSFET") switches. The pair of MOSFET switches includes a charging and a discharging MOSFET switches in series with the battery operating as a bidirectional switch. A UPS unit may be charged and subsequently stored for period of time. During this time, plurality of features may prevent current leakage from the batteries. For example, PNP bipolar transistors and additional MOSFET switches may be used to prevent current leakage. These features alone or in combination may allow for long term storage of the uninterruptible power supply units without current leakage.

19 Claims, 9 Drawing Sheets

(56) References Cited

U.S. PATENT DOCUMENTS

| | | |
|---|---|---|
| 7,432,617 B2 | 10/2008 | Kanouda et al. |
| 7,868,480 B2 | 1/2011 | Miles |
| 8,432,136 B2 | 4/2013 | Ashida |
| 8,803,360 B2 | 8/2014 | Konecny et al. |
| 2001/0033502 A1 | 10/2001 | Blair et al. |
| 2002/0136042 A1 | 9/2002 | Layden et al. |
| 2003/0205939 A1 | 11/2003 | Crosman et al. |
| 2005/0036253 A1 | 2/2005 | Tian et al. |
| 2005/0037241 A1 | 2/2005 | Schneider et al. |
| 2005/0043859 A1 | 2/2005 | Tsai et al. |
| 2005/0057100 A1 | 3/2005 | Crusius et al. |
| 2005/0275373 A1 | 12/2005 | Guang et al. |
| 2006/0076933 A1 | 4/2006 | Mandai |
| 2007/0075684 A1 | 4/2007 | Liu et al. |
| 2007/0109708 A1 | 5/2007 | Hussman et al. |
| 2007/0236204 A1 | 10/2007 | Tateno et al. |
| 2007/0262761 A1 | 11/2007 | Ishigaki et al. |
| 2008/0265682 A1 | 10/2008 | Huang et al. |
| 2009/0009005 A1 | 1/2009 | Luo et al. |
| 2009/0072623 A1 | 3/2009 | Liao |
| 2009/0267587 A1 | 10/2009 | Tateno et al. |
| 2010/0013312 A1 | 1/2010 | Groff et al. |
| 2010/0237828 A1 | 9/2010 | Maegawa |
| 2011/0040450 A1 | 2/2011 | Izutani et al. |
| 2011/0085275 A1 | 4/2011 | Ohshima |
| 2011/0095727 A1 | 4/2011 | Yeh et al. |
| 2011/0148200 A1 | 6/2011 | Burns et al. |
| 2011/0260544 A1* | 10/2011 | Imai et al. ................. 307/66 |
| 2011/0285352 A1 | 11/2011 | Lim et al. |
| 2012/0068541 A1 | 3/2012 | Anderson |
| 2012/0235488 A1 | 9/2012 | Hamanaka et al. |
| 2012/0319653 A1 | 12/2012 | Kumar et al. |
| 2013/0038295 A1 | 2/2013 | Kao et al. |
| 2013/0043841 A1 | 2/2013 | Wei |
| 2013/0187468 A1 | 7/2013 | Kim et al. |
| 2013/0187471 A1 | 7/2013 | Kim et al. |

OTHER PUBLICATIONS

International Search Report & Written Opinion dated May 15, 2013 for Application No. PCT/US2013/022458.

\* cited by examiner

BATTERY LEAKAGE CURRENT ELIMINATION IN UPS UNITS

CROSS-REFERENCE TO RELATED APPLICATION

The present application claims the benefit of the filing date of U.S. Provisional Patent Application No. 61/590,060 filed Jan. 24, 2012, the disclosure of which is hereby incorporated herein by reference.

BACKGROUND

Various systems utilize battery backup supply architectures, such as uninterruptible power supply ("UPS") units. The UPS units include batteries that are charged during periods when the system is being powered by an external power supply. If the external power supply is lost, the batteries are used to power the system's load. A typical system may use two different power supplies, one to run the components (such as devices in a server array) and another to charge the batteries. This arrangement may also require that the system has separate charging and discharging circuits for the UPS units. These dual arrangements can be relatively costly to produce, set up, and power.

In some examples, charged UPS units may be removed from the external power supply and load and stored for a period of time. However, current may leak from the a battery during this storage period, causing the battery to be continuously discharged. As a result, the batteries of the UPS unit may be drained within a matter of months. If the battery charge becomes too low, the battery may not be able to be charged, and the UPS unit becomes unusable.

SUMMARY

One aspect of the disclosure provides an uninterruptible power supply unit. The uninterruptible power supply unit includes a battery. The uninterruptible power supply unit also a first MOSFET switch and a second MOSFET switch connected in series to the battery. When the second MOSFET is in a fully on condition of a switching mode, the uninterruptible power supply unit is configured to provide power to a load. The uninterruptible power supply unit includes a controller for controlling charging of the batteries through the first MOSFET switch when the first MOSFET switch is in a linear operation mode and the uninterruptible power supply is connected to a power supply. The uninterruptible power supply unit also includes a first transistor arranged between the controller and the first MOSFET switch such that when the uninterruptible power supply unit is not connected to the external power supply, the first transistor reduces current leakage at the controller.

In one example, the first transistor is a PNP bipolar transistor. In another example, the uninterruptible power supply unit also includes a second transistor, a protection circuit connected to the first MOSFET and the second MOSFET, the protection circuit being configured to protect the uninterruptible power supply unit during abnormal conditions by switching the first MOSFET switch and the second MOSFET switch to an off condition at the second transistor to disconnect the uninterruptible power supply unit, and a third transistor arranged between the protection circuit and the second transistor such that when the uninterruptible power supply unit is not connected to the external power supply, the third transistor reduces current leakage at the protection circuit. In this example, the second transistor is an NPN bipolar transistor and the third transistor is a PNP bipolar transistor. In addition, the uninterruptible power supply unit, including the first transistor and the third transistor, is configured to eliminate leakage current. In another example, the uninterruptible power supply unit also includes a voltage divider associated with the battery, a third MOSFET switch connected in series with the voltage divider, and a second transistor associated with the voltage divider. In this example, the third MOSFET switch and second transistor reduce current leakage at the voltage divider. In addition, the second transistor is a PNP bipolar transistor.

Another aspect of the disclosure provides an uninterruptible power supply unit. The uninterruptible power supply unit includes a battery. The uninterruptible power supply unit also includes a first MOSFET switch and a second MOSFET switch connected in series to the battery. When the second MOSFET is in a fully on condition of a switching mode, the uninterruptible power supply unit is configured to provide power to a load. The uninterruptible power supply unit includes a first transistor, a protection circuit connected to the first MOSFET and the second MOSFET, the protection circuit being configured to protect the uninterruptible power supply unit during abnormal charging conditions by switching the first MOSFET switch and the second MOSFET switch to an off condition at the first transistor to disconnect the uninterruptible power supply unit, and a second transistor arranged between the protection circuit and the second transistor such that when the uninterruptible power supply unit is not connected to the external power supply, the second transistor reduces current leakage at the protection circuit.

In one example, the first transistor is an NPN bipolar transistor and the second transistor is a PNP bipolar transistor. In another example, uninterruptible power supply unit also includes a voltage divider associated with the battery, a third MOSFET switch connected in parallel with the voltage divider, and a third transistor associated with the voltage divider. In this example, the third MOSFET switch and second transistor reduce current leakage at the voltage divider. In addition, the third transistor is a PNP bipolar transistor. In another example, the uninterruptible power supply unit, including the second transistor, is configured to eliminate leakage current.

A further aspect of the disclosure provides an uninterruptible power supply unit including a battery. The uninterruptible power supply unit also includes a first MOSFET switch and a second MOSFET switch connected in series to the battery. When the second MOSFET is in a fully on condition of a switching mode, the uninterruptible power supply unit is configured to provide power to a load. The uninterruptible power supply unit includes a voltage divider associated with the battery, a third MOSFET switch connected in series with the voltage divider, and a first transistor associated with the voltage divider. The third MOSFET switch and first transistor reduce current leakage at the voltage divider.

In one example, the first transistor is a PNP bipolar transistor. In another example, the uninterruptible power supply unit also includes a controller for controlling charging of the batteries through the first MOSFET switch when the first MOSFET switch is in a linear operation mode and the uninterruptible power supply is connected to a power supply, a second transistor arranged between the controller and the first MOSFET switch such that when the uninterruptible power supply unit is not connected to the external power supply, the second transistor reduces current leakage at the controller, a third transistor, a protection circuit connected to the first MOSFET and the second MOSFET, the protection circuit being configured to protect the uninterruptible power supply unit during abnormal charging conditions by switching the first MOSFET switch and the second MOSFET switch to an off condition at the third transistor to disconnect the uninterruptible power supply unit, and a fourth transistor arranged between the protection circuit and the third transistor such that when the uninterruptible power supply unit is not connected to the external power supply, the second transistor reduces current leakage at the protection circuit. In this example, the second transistor is a PNP bipolar transistor. In addition, the third transistor is an NPN bipolar transistor and the fourth transistor is a PNP bipolar transistor. In another example, uninterruptible power supply unit, including the third MOSFET switch, the first transistor, the second transistor, the third transistor, and the fourth transistor, is configured to eliminate leakage current.

DETAILED DESCRIPTION

Conventional UPS units often use a mechanical switch or relay in series with the batteries to disconnect the battery from the external power supply, such as a DC bus. Typically, these mechanical switches are not used to control the charging of multiple batteries as they are not able to regulate the individual charging current of each battery. An AC-DC power supply is able to limit the battery current of only a single UPS by regulating a common DC bus voltage. This also does not allow for individual control of the charging current. In such systems, the charging current is dependent upon the characteristics of the batteries within the UPS. In addition, the charging power of the UPS is unknown, so provisioning power for both an AC source and an AC-DC power supply cannot be adequately planned. Without limiting the battery charging current of individual UPS units, the AC-DC power supply must be over-rated to support the load and overall unknown charging power. Batteries that exceed the recommended charging current may heat up, thus shortening the battery's lifetime and causing safety concerns.

The configurations described herein disclose an active device in a UPS rather than a mechanical switch. For example, by utilizing two metal-oxide semiconductor field effect transistor ("MOSFET") switches in series as a bi-directional switch, the MOSFET switches may act as a disconnect device. For example, the MOSFET switches may disconnect the battery or batteries from the DC bus in case of any faults detected within the UPS unit. The MOSFET switches may also be used for discharging and charging, and thus, a separate battery charger or backup converter are not needed.

Figure 1:
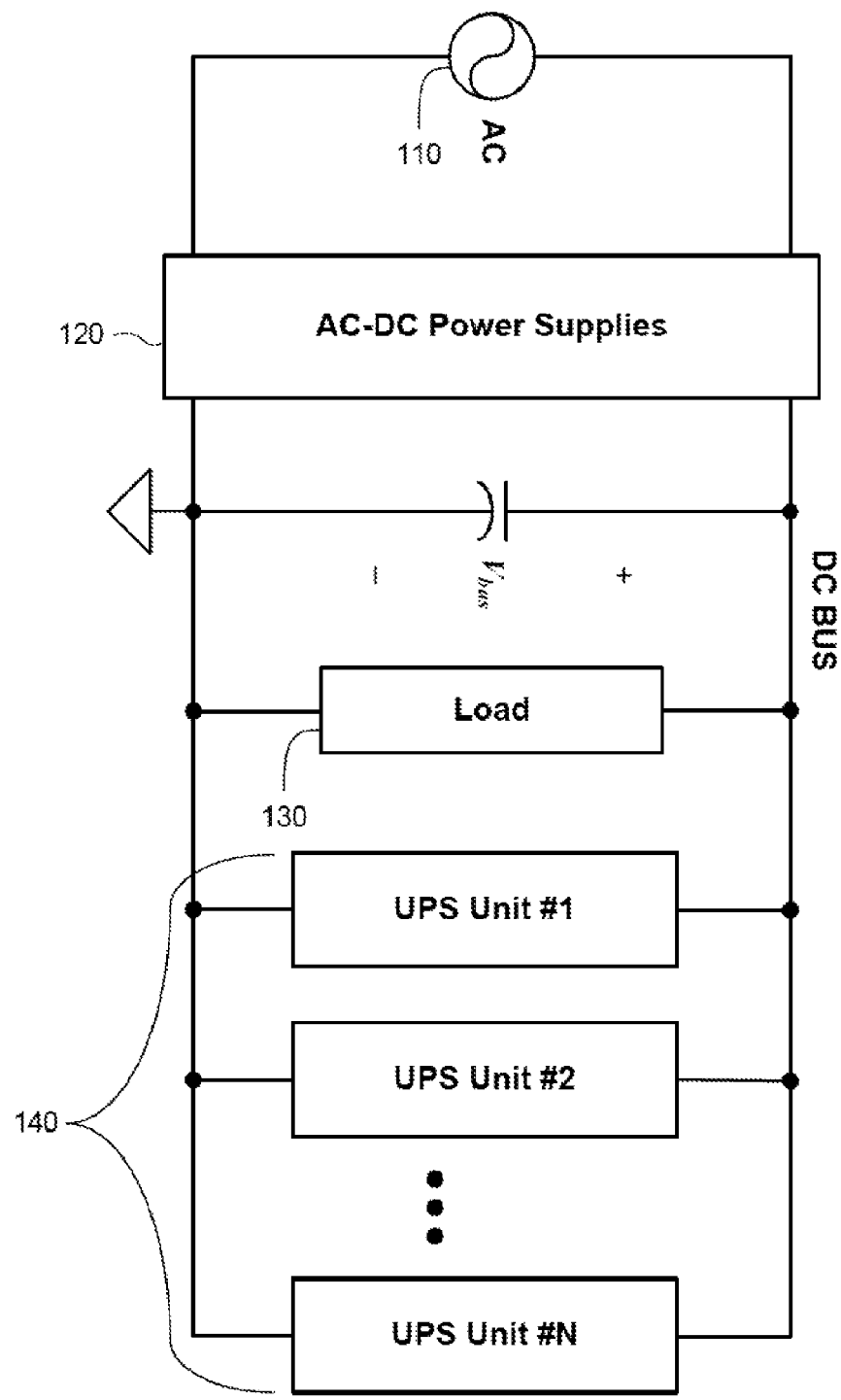
FIG. 1 is an example diagram of power architecture in accordance with implementations of the disclosure.

FIG. 1 is an example of a distributed power architecture 100 for a server system having a load and a plurality of UPS units 140. In this example, the architecture includes an AC power supply 110 that supplies power to AC-DC power supplies 120. These power supplies may include, for example, one or more rectifiers. The AC-DC power supplies 120 provide power to a load 130. In this example, the load 130 may include a plurality of computing components.

The AC-DC power supplies 120 are also connected to the plurality of UPS units 140. As shown in FIG. 1, the UPS units 140 are arranged on a common DC distribution bus in parallel with the AC-DC power supplies 120 and the load 130. The UPS units 140 are used to ensure continued operation of the load 130 in the event of a failure of the AC power supply 110 and/or AC-DC power supplies 120. The number of UPS units (N) used in the system may be determined based on the amount of backup power required to power the load for some pre-determined period of time.

Figure 2:
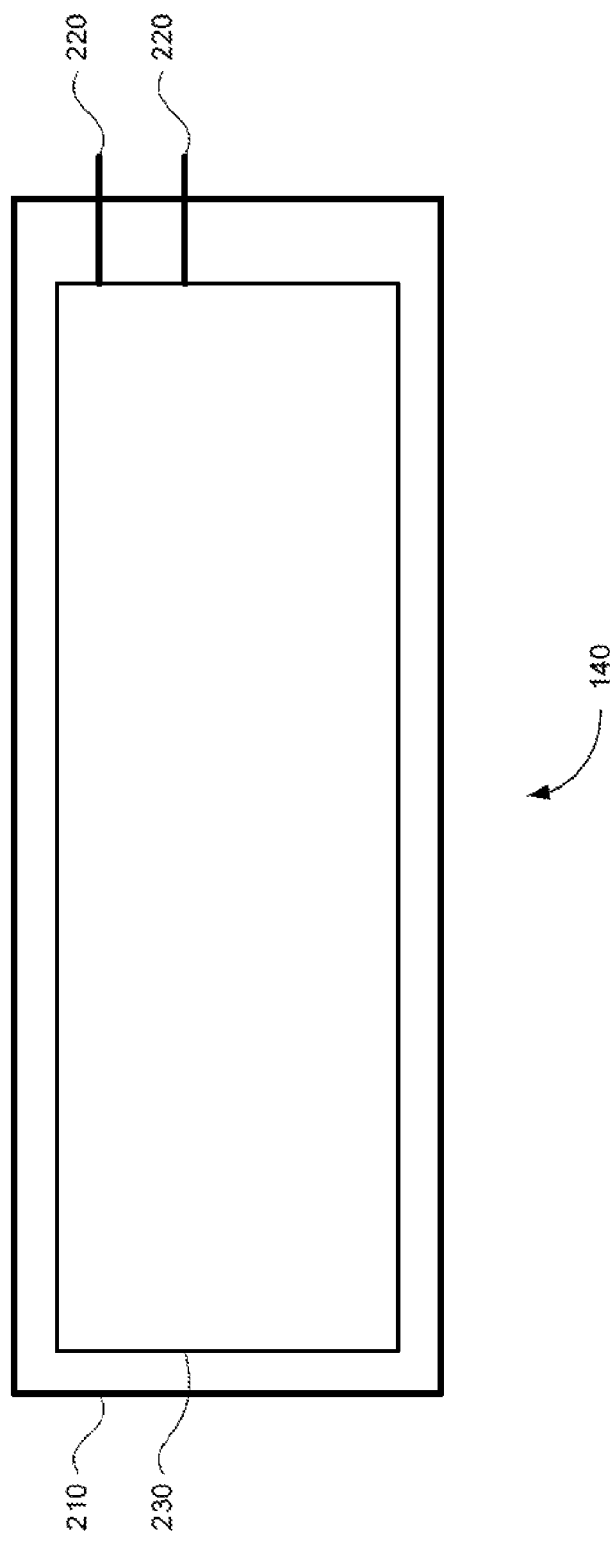
FIG. 2 is a diagram of a UPS unit in accordance with implementations of the disclosure.

FIG. 2 is an example of a UPS unit 140. In this example, the UPS unit 140 includes a housing 210, power terminals 220 to receive power from the AC-DC power supplies 120, and UPS unit circuitry 230.

Figure 3:
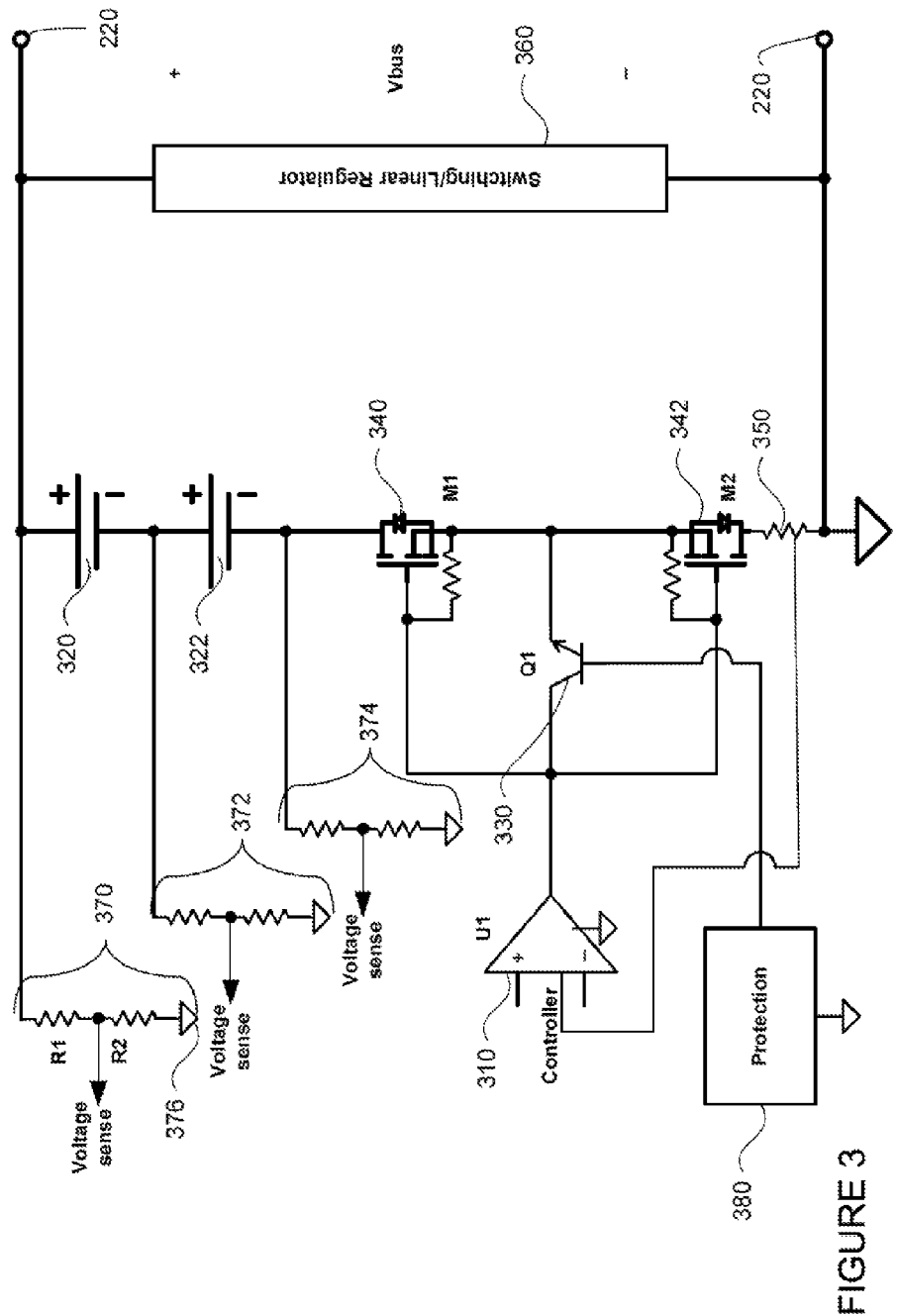
FIG. 3 is an example of various circuits of UPS units in accordance with implementations of the disclosure.

FIG. 3 is an example of UPS unit circuitry 230 that may be used with the UPS unit 140. In this example, the UPS unit circuitry includes a controller 310, a battery pack having batteries 320 and 322 (only two being shown, though more batteries may be included in a single battery pack), switches 340 and 342, and a feedback device 350. In addition, this circuit may also include a protection circuit 380 and a transistor 330 for fast off switching of the switches 340 and 342 based on temperature, voltage and current information associated with the batteries. As shown in these examples, the batteries 320 and 322, the switches 340 and 342, and the feedback device 350 are arranged in series with one another. The UPS unit may also include a switching/linear regulator 360 for bias internal power.

The switches 340, 342 desirably comprise MOSFET switches. MOSFET switches are used to supply current for battery charging and discharging. The MOSFET switches have different modes of operation. For example, a MOSFET switch may have a switched mode of operation, including a "fully off" condition and a "fully on" condition. Another mode of operation is a linear region of operation where the drain-to-source voltage and/or current can be regulated by adjusting gate-to-source voltage. In this example, when operating in the linear region, the MOSFET allows a gate-to-source voltage of between 0 and 12 volts to pass through the MOSFET's gate. Whether a MOSFET is used as a switch or is being operated in a linear mode depends on whether the batteries are being charged (linear operation), discharged (on), or disconnected (off) from the load and the AC power supply.

The pair of MOSFET switches may be used for both the charging and discharging of the batteries. For example, MOSFET switch 340 can be used to control the charging of the batteries while MOSFET switch 342 can be used for discharging of the batteries. This combination of a charging MOSFET and a discharging MOSFET allows operation as a bidirectional switch.

The controller 310 may be, in one example, an amplifier configured to receive information from the feedback device. Based on the received information, the controller is able to automatically transition the UPS unit from using an outside power supply to charge the battery to supplying power to a load. The feedback device 350 can include a shunt or current sense resistor. In the examples of FIG. 3, the feedback device senses current from one of the power terminals 220 and sends it to the negative terminal of the controller 310.

The controller automatically detects the state of the bus voltage based on current feedback received from the feedback device 350. For example, when the DC bus voltage is greater than the battery voltage, the controller is in charging mode. In the charging mode, the controller regulates or limits the charging current through MOSFET switch 340 by adjusting the gate-to-source voltage of the MOSFET switch 340 based on current received from the feedback device 350. In one example, the controller 310 is desirably associated with a reference current value. This value can be set through a pulse-width modulation (PWM) signal 360 at the positive terminal of the controller 310. Thus, the reference current value is adjustable based on the needs of the system. For example, the AC-DC power supplies 120 must produce enough current to power the load 130 and the number of UPS units (N) for charging. Because the reference current for each UPS unit may be set, this allows for an accurate calculation of how much power is needed for the load and charging the UPS units.

In some examples, the reference charging current value is set very low in comparison to the discharging current needed to power the load. By using a relatively low charging current, the thermal stress on the charging MOSFET operating in the linear region is low as well. If the current through the charging MOSFET is too high, the MOSFET can heat up and fail. This can also reduce the power drain on the AC-DC power supplies 120.

When the terminals of UPS unit are initially connected to the power from the AC-DC power supplies 120, the controller receives charging current feedback from the feedback device 350. In response, the controller 310 generates a gate voltage in order to activate the MOSFET switches. Using the 12 volt example, the controller 310 increases the gate voltage of the MOSFET switches to between 0 and 12 volts depending upon the reference current value. This can set the MOSFET switches, both 340 and 342, to the active condition (in the linear region of operation) and allow the battery pack 320 to charge.

In this case, the controller compares the reference current value and the information from the feedback device, and adjusts the current through the MOSFET switch 340 in order to control the charging of the battery pack 320. The charging current feedback at the negative terminal, received from the feedback device 350, follows the current defined at the positive terminal in voltage.

When the charging current becomes a bit lower than the reference current value, the DC bus voltage will be very close to or the same as the battery voltage. At this point, the battery may be almost fully charged. In response to current feedback from the current sense device, the output of the controller may be saturated at the maximum gate voltage and the battery is float charged to keep the battery close to or at its fully charged level.

As noted above, the control circuitry 230 can also be used for discharging. If the external power supply 110 and/or AC-DC power supplies 120 fail, the power received at the terminals 220 of the UPS device will drop off. The DC bus voltage will be less than the battery voltage. This causes the charging current feedback to be significantly lower than the reference current value. The difference between the charging current feedback and the reference current value causes the controller's output to go into saturation and causes the MOSFET switches to go into the fully on condition. In other words, the MOSFET switches are no longer operating in the linear region. At this point, the controller is no longer controlling the charging of the battery pack 320, and the current from the battery pack can discharge and flow through the terminals 220 to power the load 130. Having the MOSFET switches in the fully on condition when the battery pack is discharging can also reduce conduction loss.

The battery pack can continue to discharge until the battery pack is fully discharged or until the external power supply 110 and/or AC-DC power supplies 120 have been restored. When the external power supply has been restored, the UPS unit can automatically transition from discharging to charging via the controller.

When the power from the AC-DC power supplies 120 is restored, the charging current feedback causes the controller 310 to immediately regulate the charging current to the battery pack as described above.

The protection circuit 380 may be configured to turn off both MOSFET switches 340 and 342 in order to disconnect the battery from the DC bus. The protection circuit 380 may include a microcontroller, CPU, or any type of circuit that can sense the condition of the current, temperature or voltage of the battery. For example, the terminals of the batteries 320, 322 are associated with voltage dividers 370, 372, 374. If there are more batteries, more voltage dividers may also be used. For example, if there are four batteries, five voltage dividers may be used.

Each voltage divider may be associated with resistors referenced to a ground. For example, voltage divider 370 is associated with resistors R1 and R2 connected to a ground 376. The voltage across these resistors may be sensed to determine the voltage of the batteries. The output of the voltage dividers may be sent to the protection circuit 380 (not shown).

If one or more of the current, temperature or voltage of the battery conditions is outside of a predetermined normal operating range (for example, operating at an abnormal voltage, current, and/or temperature), the protection circuit 380 may automatically switch the MOSFET switches 340 and 342 to the off condition through transistor 330 disconnecting the UPS from the AC-DC power supply and the load. In this example, transistor 330 may include an NPN bipolar transistor. The protection circuit may operate much faster to shut off the MOSFET switches than the controller.

Figure 4:
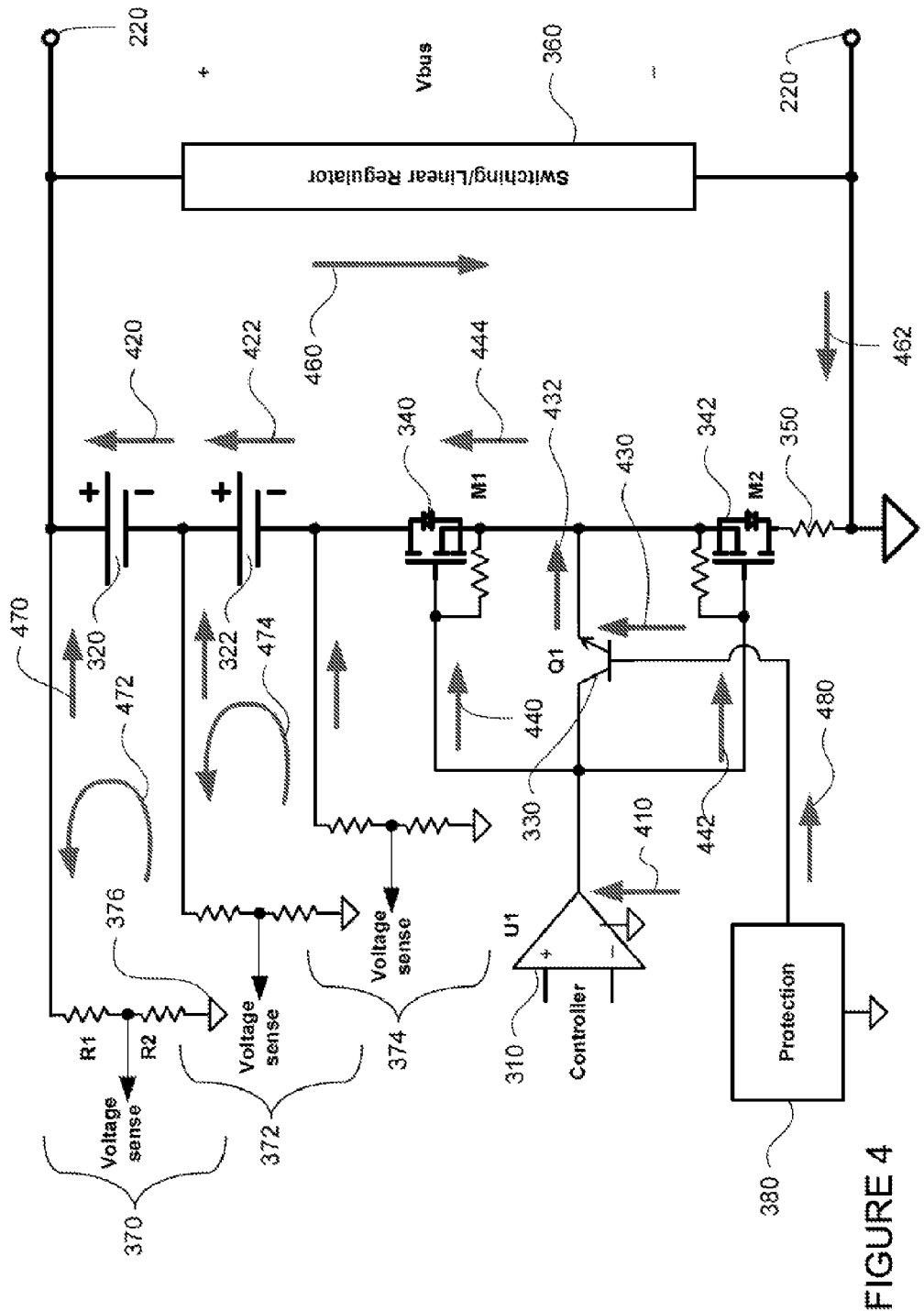
FIG. 4 is an example of various leakage current paths for the circuits of UPS units in accordance with implementations of the disclosure.

When a fully charged uninterruptible power supply unit is removed from the rack for example, for long term storage, current flow may continue through the MOSFET switches and the batteries. FIG. 4 also provides some examples of possible leakage current paths. For example, the output of the controller 310 has an ESD (electrostatic discharge diode). Current passes through the ESD diode and the resistors across the gate to source of MOSFET switches 340 and 342. This current flows from arrow 410 along the path of arrows 440 and 442 through MOSFET switches 340 and 342. Current then flows along the path of arrow 444 and towards the batteries 320, 322 along the path arrows 420, 422.

In another example, current may flow from the protection circuit 380 through the emitter of transistor 330. This current flows from the protection circuit 380 along the path of arrow 480 through transistor 330 at arrow 430. Current continues along the path of arrow 432 and from arrow 444 towards the batteries 322 and 320 along arrows 422 and 420.

In a further example, the resistors of the voltage dividers also provide leakage current paths. In this example, current flows from the grounds of voltage dividers to the batteries. For example, using the example of voltage divider 370, current flows from the ground 376 through the resistors R1 and R2 along the path of arrow 470 towards the battery 320. Similar leakage paths may also exist for the other voltage dividers of the UPS unit, such as voltage dividers 372, 374. In addition, circulating current between the voltage dividers and through the batteries, such as along arrows 472 or 474, is also possible.

Current may also flow from the switching/linear regulator 360 to the batteries. For example, current may flow from arrow 460 along the path of arrow 462. Current then flows along the path of arrow 444 and towards the batteries 322 and 320 along arrows 422 and 420.

While some features of the UPS circuitry of FIGS. 3 and 4 may reduce the leakage current, there may still be a small leakage current when the UPS unit is not connected to the rack. For example, the switching/linear regulator 360 may have relatively high impedance, and without the discharging MOSFET switch 342, leakage current would always flow to the batteries. However, the leakage shown in the example of FIG. 4 may still be on the order of 10 mA. However, over time, even a small leakage may cause significant drain on the batteries. For example, a fully charged UPS unit, once removed from the rack, may be completely drained by such a small leakage in a matter of months. If the battery charge becomes too low, the battery may not be able to be charged, and the UPS unit no longer usable.

Figure 5:
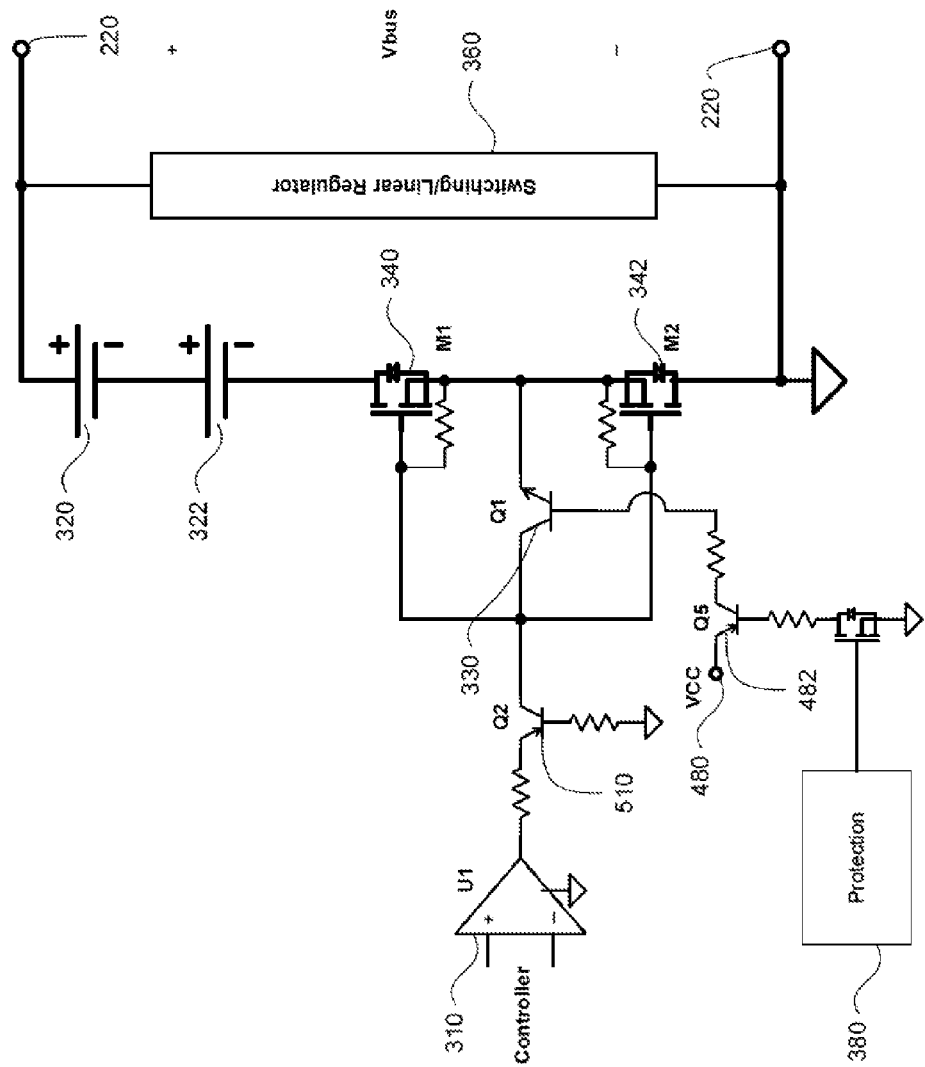
FIG. 5 is another example of various circuits of UPS units in accordance with implementations of the disclosure.

A plurality of different solutions may be used alone or in combination to reduce or even eliminate leakage current. FIG. 5 is an example of how to eliminate the leakage current in the UPS unit of FIG. 3. In this example, certain of the features of FIG. 3 are not shown for clarity, though they may still be included in the UPS unit circuitry. When a UPS unit is not connected to a power supply or load, for example during storage, the controller 310 may be disabled. The PNP bipolar transistor 510 blocks and completely eliminates the leakage current since a base-emitter PN junction of the PNP bipolar transistor is reverse biased.

Similarly, when a UPS unit is not connected to a power supply or load, for example during storage, VCC 480 may be disabled. The PNP bipolar transistor 482 blocks and completely eliminates the leakage current since a base-emitter PN junction of the PNP bipolar transistor is reverse biased.

Figure 6:
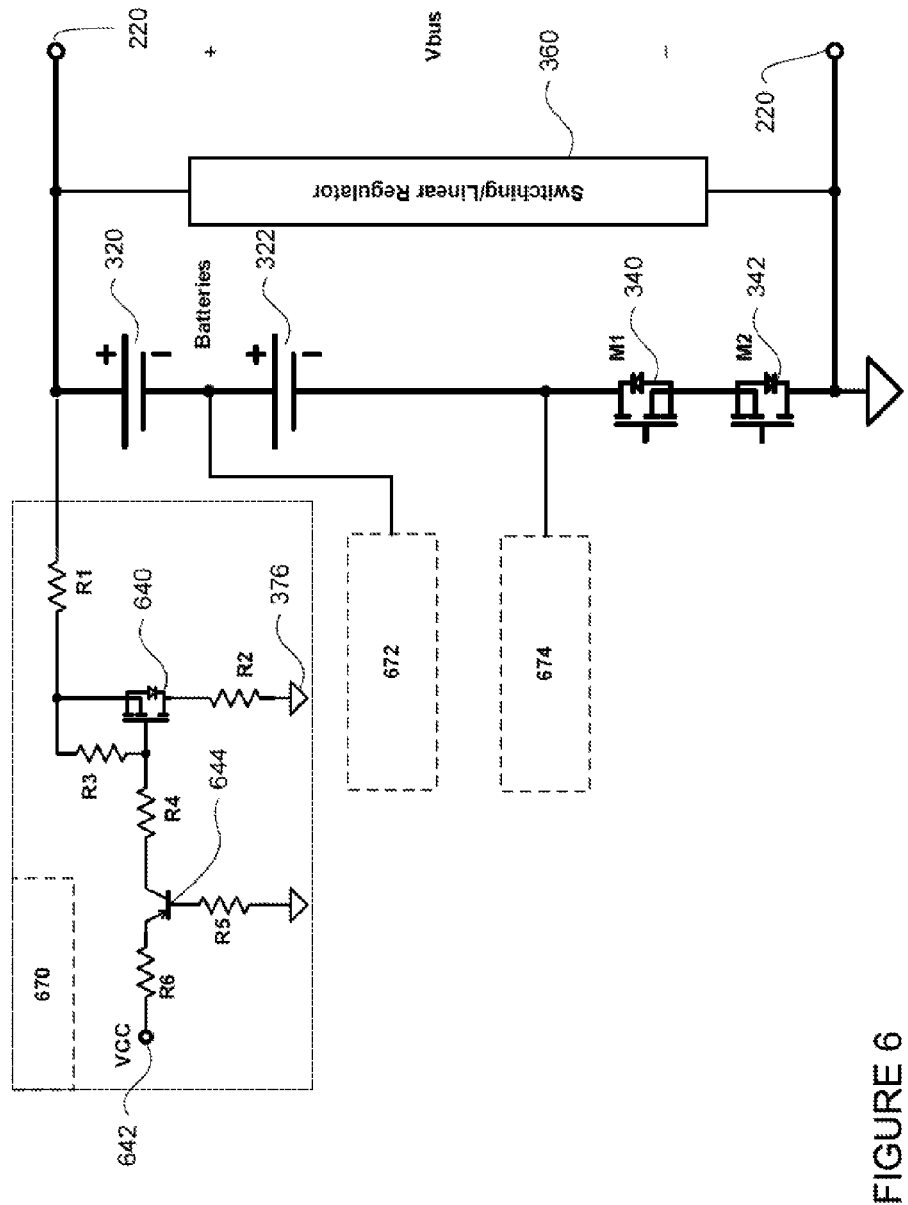
FIG. 6 is a further example of various circuits of UPS units in accordance with implementations of the disclosure.

FIG. 6 is an example of a voltage sense scheme in a UPS unit for leakage current reduction. In this example, certain of the features of FIG. 3 are not shown for clarity, though they may still be included in the UPS unit circuitry. As noted above with regard to FIG. 3, the battery terminals may be associated with a voltage divider. FIG. 6 depicts an example of voltage sense schemes 670, 672, 674 for the two batteries 320 and 322. Again, if there are additional batteries, additional voltage sense schemes may be used. For example, voltage sense scheme 670 includes the components of voltage divider 370 (with R1, R2, and ground 376). Voltage sense scheme 370 also includes a MOSFET switch 640 to eliminate leaking current. A body diode of MOSFET switch 640 prevents leaking current when MOSFET switch 640 is in the off condition. During operation of the UPS unit (e.g. charging, discharging), the MOSFET switch 640 must be switched on. In order to do so, the UPS unit circuitry also includes VCC 642. To prevent current from leaking from VCC 642 (and activating MOSFET switch 640), voltage sense scheme 670 may also include a PNP bipolar transistor 644. As with the examples described above, the PNP bipolar transistor 644 blocks the leakage current since a base-emitter PN junction of the PNP bipolar transistor is reverse biased. In the example of FIG. 6, each of blocks 672 and 674 may include the voltage sense scheme of block 670.

As described above, MOSFET switch 342 also prevents leakage current. As MOSFET switch 342 is turned off when the UPS is not connected to the system, MOSFET switch 342 disconnects the leakage current path from the switching/linear regulator 360.

Figure 7:
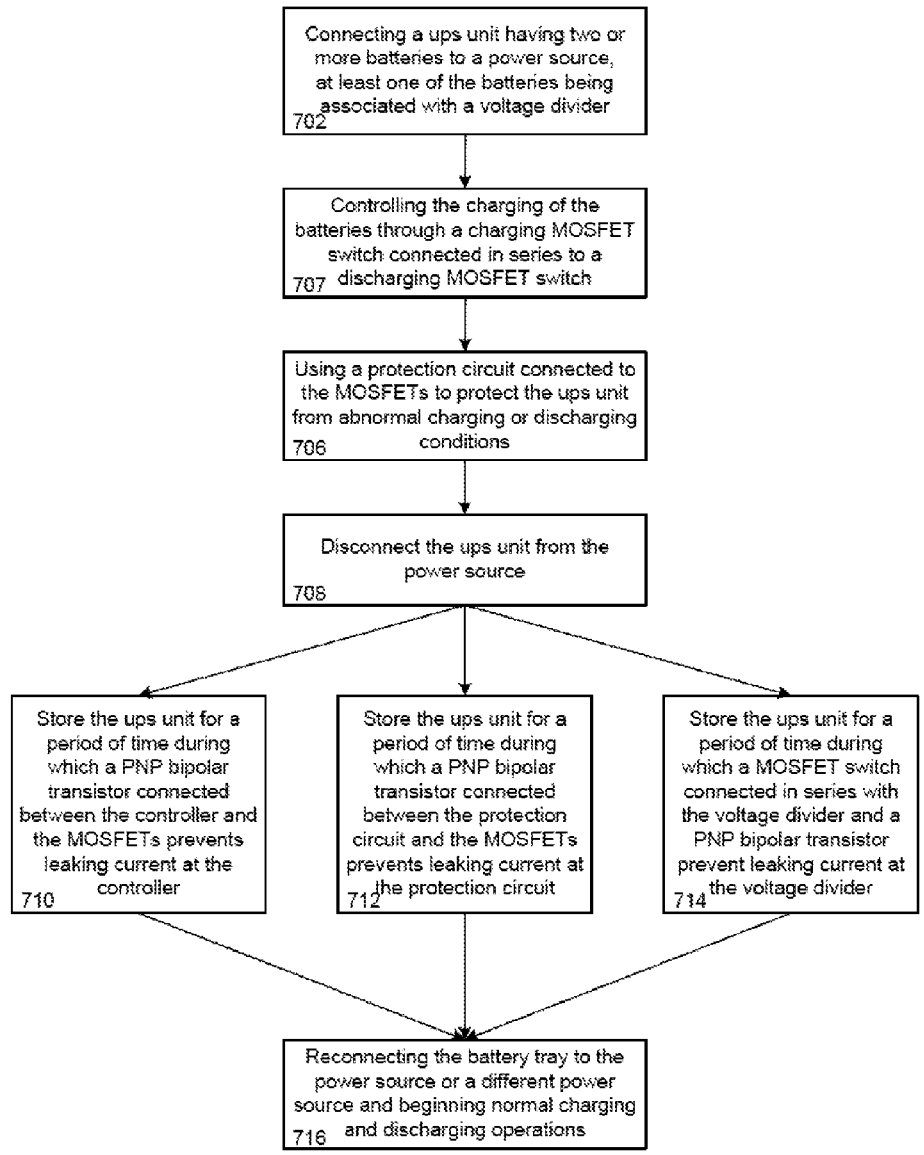
FIG. 7 is an example flow diagram in accordance with implementations of the disclosure.

Flow diagram 700 of FIG. 7 is an example of some of the aspects described above. For example, as shown in block 702, a uninterruptible power supply unit having two or more batteries is connected to a power supply. At least one of the batteries is associated with a voltage divider. At block 704, the uninterruptible power supply unit controls the charging of the batteries through a charging MOSFET switch as described in detail above. This charging MOSFET may be arranged in series with a discharging MOSFET. At block 706, a protection circuit connected to the charging and discharging MOSFETs may be used to detect any abnormal battery conditions. For example, the voltage divider may also be used by the protection circuit to detect over voltage situations at the battery and shut down the charging process as described above in order to protect the uninterruptible power supply unit.

Once the batteries are fully charged, or less than fully charged, the uninterruptible power supply unit and the external power supply may be disconnected from one another at block 708. The uninterruptible power supply unit may then be stored for a period of time. As shown in blocks 710, 712, and 714, the battery box's circuitry may be configured in order to reduce or eliminate any leakage current. For example, at block 710, a PNP bipolar transistor connected between the controller and the MOSFET switches prevents leakage current at the controller. In the example of block 712, PNP bipolar transistor connected between the protection circuit and the MOSFET switches prevents leakage current at the protection circuit. In yet another example at block 714, a MOSFET switch and another PNP bipolar transistor connected in series with the voltage divider prevent leakage current from the voltage divider to the battery. Again, as noted above, each of these examples may be used alone or in combination in order to reduce or eliminate leakage of the current during a storage period.

After the period of time has passed, the uninterruptible power supply unit may be reconnected to the external power supply or to a different power supply at block 716. The UPS unit may then begin the charging and discharging operations as described above.

By using a combination of the features described above, the battery leakage current paths of FIG. 4 may be eliminated or very close to zero μA. This allows for long term storage of these UPS units without concerns over power loss or damage to the UPS unit from battery leakage.

Figure 8A:
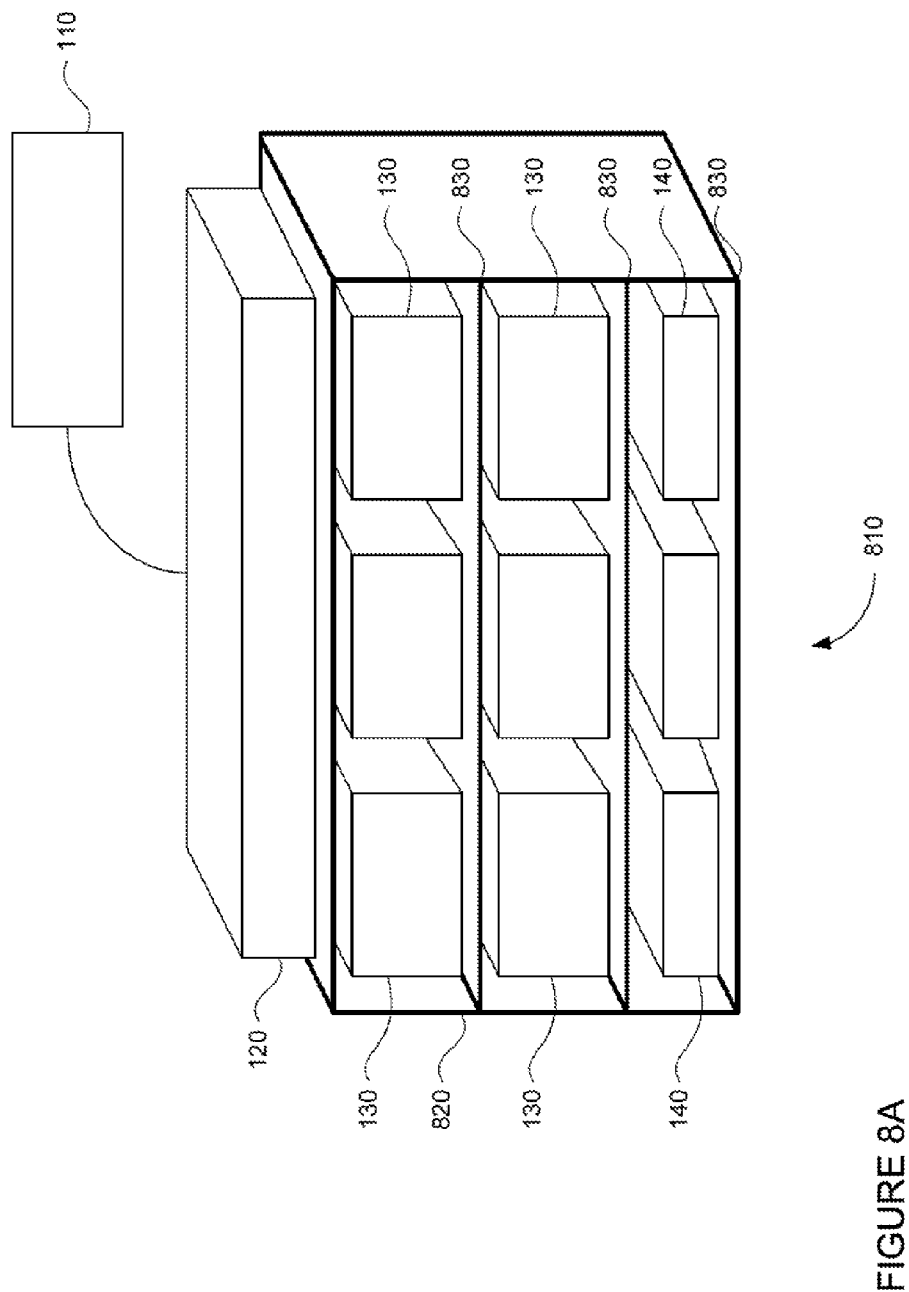
FIG. 8A is an example of a server architecture in accordance with implementations of the disclosure.

The UPS units described herein can be used in conjunction with various backup power systems. For example, these devices may be useful in telecom systems or server architectures. FIG. 8A is an example of a server architecture including a plurality of the UPS units described herein. In this example, the server 810 includes a rack 820, having a set of shelves 830, for housing the load 130 as well as the UPS units 140. The server architecture may include an external power supply such as AC-DC power supplies 120. This external power supply can be incorporated into the rack 810 (as shown in FIG. 8A) or can be at a different location, for example, as the AC power supply 110 is shown in FIG. 8A.

The load 130 can include a variety of devices. For example, the load 130 can include a dedicated storage device, for example, including any type of memory capable of storing information accessible by a processor, such as a hard-drive, memory card, ROM, RAM, DVD, CD-ROM, or solid state memory. The load may include a preprogrammed load which draws power from the AC-DC power supplies 120 in order to test the operation of the server 810. The load 40 may also include a computer including a processor, memory, instructions, and other components typically present in server computers.

Figure 8B:
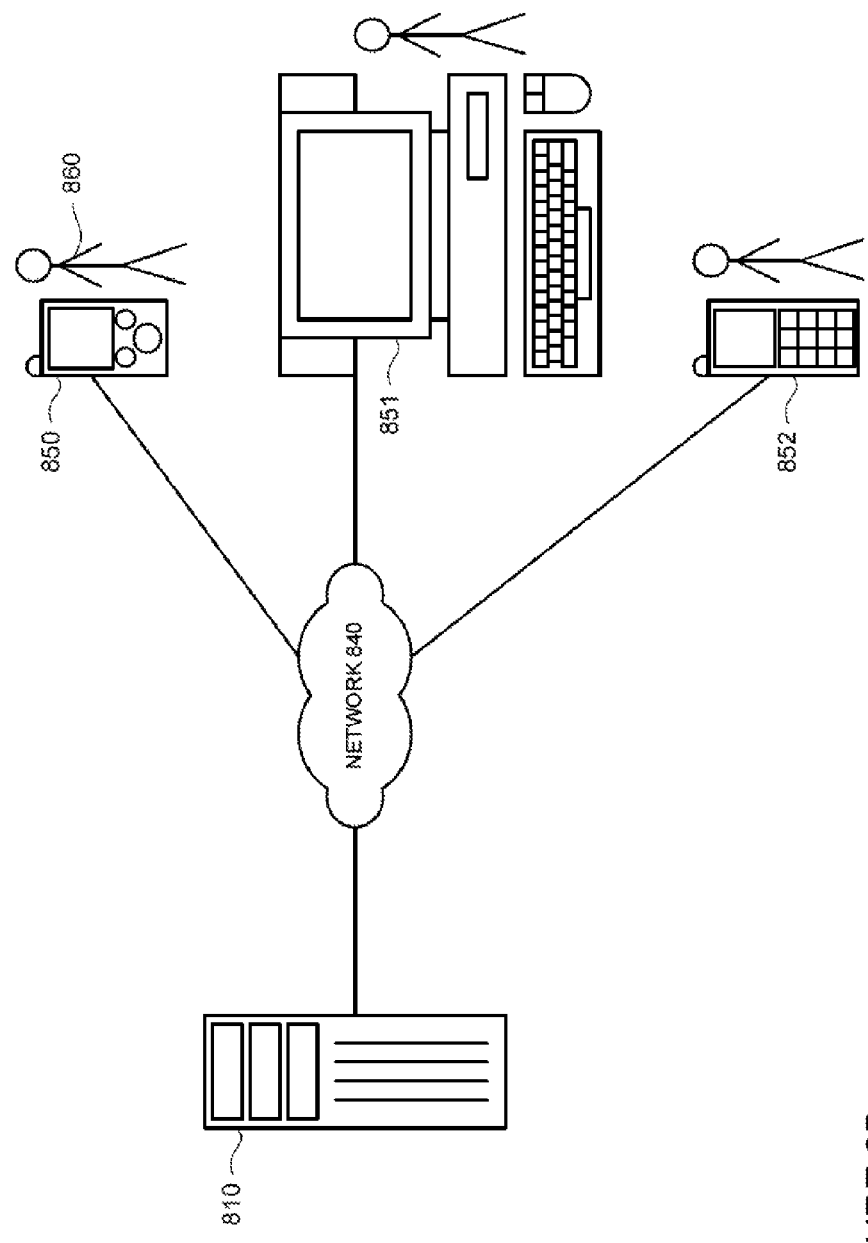
FIG. 8B is an example of a network system architecture in accordance with implementations of the disclosure.

FIG. 8B is an example of a network system including the server architecture of FIG. 8A. For example, server 810 may be at one node of a network 840 and capable of directly and indirectly communicating with other nodes of the network. For example, these computers may exchange information with different nodes of a network for the purpose of receiving, processing and transmitting data to one or more client devices 850-52 via network 840. In this regard, server 810 may transmit information for display to user 860 on display of client device 850. In the event of a failure of the AC power supply 110, the UPS units may allow the server 810 to continue communications with the other nodes without interruption.

As these and other variations and combinations of the features discussed above can be utilized without departing from the subject matter defined by the claims, the foregoing description of the embodiments should be taken by way of illustration rather than by way of limitation of the subject matter defined by the claims. It will also be understood that the provision of the examples disclosed herein (as well as clauses phrased as "such as," "including" and the like) should not be interpreted as limiting the claimed subject matter to the specific examples; rather, the examples are intended to illustrate only one of many possible embodiments. Further, the same reference numbers in different drawings may identify the same or similar elements.

The invention claimed is:

1. An uninterruptible power supply unit comprising:
   a battery;
   a first MOSFET switch and a second MOSFET switch connected in series to the battery, and when the second MOSFET is in a fully on condition of a switching mode, the uninterruptible power supply unit is configured to provide power to a load;
   a controller for controlling charging of the batteries through the first MOSFET switch when the first MOSFET switch is in a linear operation mode and the uninterruptible power supply is connected to a power supply; and
   a first transistor arranged between the controller and the first MOSFET switch such that when the uninterruptible power supply unit is not connected to the external power supply, the first transistor reduces current leakage at the controller.

2. The uninterruptible power supply unit of claim 1, wherein the first transistor is a PNP bipolar transistor.

3. The uninterruptible power supply unit of claim 1, further comprising:
   a second transistor;
   a protection circuit connected to the first MOSFET and the second MOSFET, the protection circuit being configured to protect the uninterruptible power supply unit during abnormal conditions by switching the first MOSFET switch and the second MOSFET switch to an off condition at the second transistor to disconnect the uninterruptible power supply unit; and
   a third transistor arranged between the protection circuit and the second transistor such that when the uninterruptible power supply unit is not connected to the external power supply, the third transistor reduces current leakage at the protection circuit.

4. The uninterruptible power supply unit of claim 3, wherein the second transistor is an NPN bipolar transistor and the third transistor is a PNP bipolar transistor.

5. The uninterruptible power supply unit of claim 3, wherein the uninterruptible power supply unit, including the first transistor and the third transistor, is configured to eliminate leakage current.

6. The uninterruptible power supply unit of claim 1, further comprising:
   a voltage divider associated with the battery;
   a third MOSFET switch connected in series with the voltage divider; and
   a second transistor associated with the voltage divider;
   wherein the third MOSFET switch and second transistor reduce current leakage at the voltage divider.

7. The uninterruptible power supply unit of claim 6, wherein the second transistor is a PNP bipolar transistor.

8. An uninterruptible power supply unit comprising:
   a battery;
   a first MOSFET switch and a second MOSFET switch connected in series to the battery, and when the second MOSFET is in a fully on condition of a switching mode, the uninterruptible power supply unit is configured to provide power to a load;
   a first transistor;
   a protection circuit connected to the first MOSFET and the second MOSFET, the protection circuit being configured to protect the uninterruptible power supply unit during abnormal charging conditions by switching the first MOSFET switch and the second MOSFET switch to an off condition at the first transistor to disconnect the uninterruptible power supply unit; and
   a second transistor arranged between the protection circuit and the second transistor such that when the uninterruptible power supply unit is not connected to the external power supply, the second transistor reduces current leakage at the protection circuit.

9. The uninterruptible power supply unit of claim 8, wherein the first transistor is an NPN bipolar transistor and the second transistor is a PNP bipolar transistor.

10. The uninterruptible power supply unit of claim 8, further comprising:
    a voltage divider associated with the battery; and
    a third MOSFET switch connected in parallel with the voltage divider; and
    a third transistor associated with the voltage divider;
    wherein the third MOSFET switch and second transistor reduce current leakage at the voltage divider.

11. The uninterruptible power supply unit of claim 10, wherein the third transistor is a PNP bipolar transistor.

12. The uninterruptible power supply unit of claim 8, wherein the uninterruptible power supply unit, including the second transistor, is configured to eliminate leakage current.

13. An uninterruptible power supply unit comprising:
    a battery;
    a first MOSFET switch and a second MOSFET switch connected in series to the battery, and when the second MOSFET is in a fully on condition of a switching mode, the uninterruptible power supply unit is configured to provide power to a load;
    a voltage divider associated with the battery; and
    a third MOSFET switch connected in series with the voltage divider; and
    a first transistor associated with the voltage divider;
    wherein the third MOSFET switch and first transistor reduce current leakage at the voltage divider.

14. The uninterruptible power supply unit of claim 13, wherein the first transistor is a PNP bipolar transistor.

15. The uninterruptible power supply unit of claim 13, further comprising:

a controller for controlling charging of the batteries through the first MOSFET switch when the first MOSFET switch is in a linear operation mode and the uninterruptible power supply is connected to a power supply;

a second transistor arranged between the controller and the first MOSFET switch such that when the uninterruptible power supply unit is not connected to the external power supply, the second transistor reduces current leakage at the controller;

a third transistor;

a protection circuit connected to the first MOSFET and the second MOSFET, the protection circuit being configured to protect the uninterruptible power supply unit during abnormal charging conditions by switching the first MOSFET switch and the second MOSFET switch to an off condition at the third transistor to disconnect the uninterruptible power supply unit; and a fourth transistor arranged between the protection circuit and the third transistor such that when the uninterruptible power supply unit is not connected to the external power supply, the second transistor reduces current leakage at the protection circuit.

16. The uninterruptible power supply unit of claim 15, wherein the second transistor is a PNP bipolar transistor.

17. The uninterruptible power supply unit of claim 15, wherein the third transistor is an NPN bipolar transistor.

18. The uninterruptible power supply unit of claim 15, wherein the fourth transistor is a PNP bipolar transistor.

19. The uninterruptible power supply unit of claim 15, wherein the uninterruptible power supply unit, including the third MOSFET switch, the first transistor, the second transistor, the third transistor, and the fourth transistor, is configured to eliminate leakage current.

* * * * *